M. G. CRANE & E. ROGERS,

Assignors, by mesne assignments, to the GAMEWELL FIRE ALARM TELEGRAPH CO.

Automatic Signal-Box for Fire-Alarm Telegraphs.

No. 8,896. Reissued Sept. 16, 1879.

Attest:

C. Clarence Poole

Raymond T. Barnes.

Inventors:

M. G. Crane and E. Rogers,

Assignors by mesne assignments to the Gamewell Fire Alarm Telegraph Company

By E. A. Ellsworth, Atty.

UNITED STATES PATENT OFFICE.

THE GAMEWELL FIRE ALARM TELEGRAPH COMPANY, OF NEW YORK, N. Y., ASSIGNEE, BY MESNE ASSIGNMENTS, OF MOSES G. CRANE AND EDWIN ROGERS.

IMPROVEMENT IN AUTOMATIC SIGNAL-BOXES FOR FIRE-ALARM TELEGRAPHS.

Specification forming part of Letters Patent No. 92,275, dated July 6, 1869; Reissue No. 4,513, dated August 15, 1871; Reissue No. 8,896, dated September 16, 1879; application filed August 13, 1879.

*To all whom it may concern:*

Be it known that we, MOSES G. CRANE, of Newton, Middlesex county, Massachusetts, and EDWIN ROGERS, of Boston, Suffolk county, Massachusetts, have invented an Improvement in Automatic Signal-Boxes for Fire-Alarm Telegraphs, of which the following is a specification, reference being had to the accompanying drawings, forming part thereof.

Figure 1:
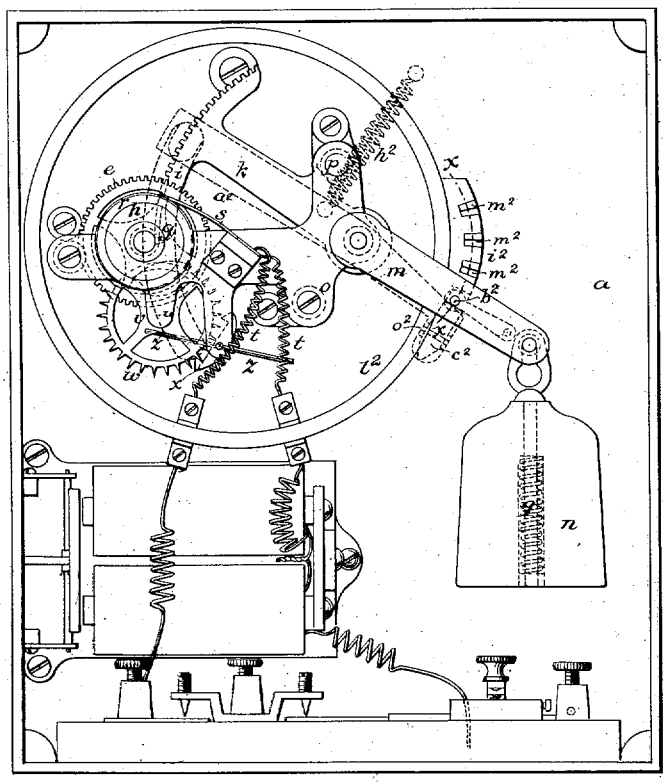
Figure 2:
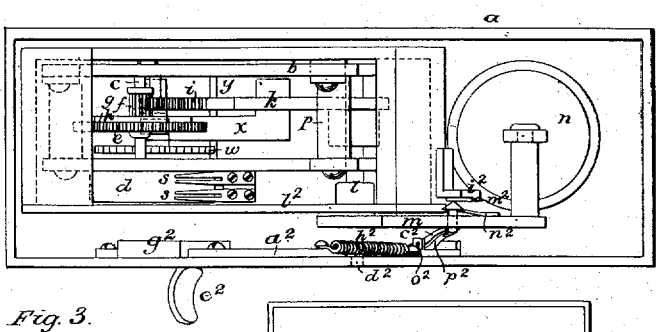
Figure 3:
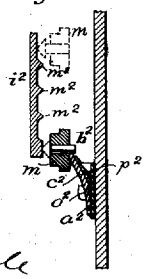
Figure 4:
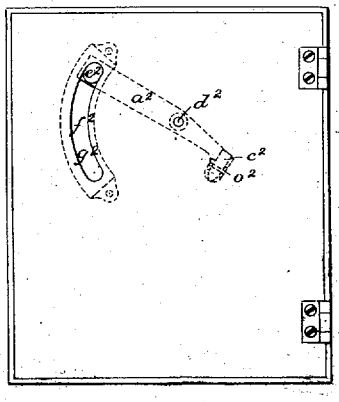

Figure 1 is a front elevation of the box with cover removed. Fig. 2 is a plan view with the top removed. Fig. 3 is a detached section on the line *x x*, Fig. 1. Fig. 4 is a front view of the door of the box.

Similar letters of reference denote the same parts in the several figures of the drawings.

Our invention relates to that class of electric-telegraph apparatus employed for indicating the location of a fire by means of suitable signals transmitted to a central station or other point remote from the transmitting apparatus. Such apparatus is generally composed of a train of gearing driven by a spring or weight, a break-circuit device operated by the gearing and electrically connected with the main line of the telegraph system, and means for starting the apparatus in motion to automatically sound an alarm or transmit a signal. This operative mechanism is inclosed within a suitable box, and hence such apparatus is technically known as an "automatic signal-box for fire-alarm telegraphs."

Much difficulty has heretofore been experienced in the use of these boxes by careless, inexperienced, or designing persons interfering with them while transmitting or indicating a signal, and thereby so falsifying and confusing the signals as to render it uncertain and sometimes impossible to tell from what locality or district the alarm is being sent.

One object of our invention is to overcome this defect by providing the box with means by which it is rendered impossible for a second signal to be given before the first one has been fully completed, thereby producing what may be called "local non-interference"—that is to say, non-interference with the box giving a signal.

It is sometimes desirable to reset the motor by which the signaling mechanism is operated for the purpose of continuing the signals; but this must be done when the signals are not being transmitted, in order to prevent local interference with the mechanism, and the accomplishment of this result constitutes another part of our invention.

The invention further consists in automatic fire-alarm-telegraph apparatus provided with a local non-interference device, and with means for arresting the movement of the signaling mechanism when the signals have been completed.

Having invented these principles of operation in an automatic fire-alarm-telegraph apparatus, we will now describe a mechanism by which they may be practically carried out. This mechanism also involves several other valuable features of invention in telegraph apparatus, which we desire to protect by Letters Patent, among which are the following, to wit: First, the combination, in an automatic signal-box for a fire-alarm telegraph, of a circuit-wheel actuated by a motor, a spring, or weight, through the means of a reciprocating gear-sector, the teeth of which sector engage directly with a pinion upon the shaft of the circuit-wheel, whereby motion is communicated directly to the circuit-wheel from the motor, instead of being transmitted to it through a train of gearing, avoiding thereby the loss of power from friction, the wear, the increased cost, and liability to derangement from rust, moisture, &c., necessarily incident to a gear-train interposed between the motor and the circuit-wheel, the pinion into which the sector thus meshes being so arranged upon and connected to the circuit-wheel shaft that it (the pinion) will rotate freely in one direction without rotating the said shaft, but will catch to the shaft, or to a wheel upon the shaft, and carry the shaft with it when rotated in the opposite direction; second, the combination, with the escapement-wheel of the gear-train, of a pallet having a reciprocating fly for regulating the motion of the circuit-wheel; third, the combination, with the gear-sector above referred to, of fixed stops for the purpose of limiting in one or both directions the rotation of the shaft on which the sector-gear is mounted; fourth, the combination, with the lever-weight and gear-train, of springs so interposed between the weight and the first or main gear as to prevent sudden or concussive strain upon the gear-teeth when the weight begins to fall; fifth, the combination, with the weighted lever, of means for preventing it from being operated or lifted when the circuit-fingers of the circuit-wheel are passing over the breaks thereof, and for allowing it to be lifted when the fingers are passing over the blank or unbroken portion of the perimeter of the circuit-wheel.

In the drawings, A denotes the box containing the mechanism; *b b*, the arbor or pillar-plates of the gearing; *c*, a shaft of the gearing, carrying a circuit-wheel, *d*, whose rotation makes and breaks the circuit formed by said wheel and main-circuit wires.

The shaft *c* also carries a gear-wheel, *e*, fixed upon it, and a pinion, *f*, arranged to turn freely on the shaft in one direction, but locked to and moving with the wheel when turning in the opposite direction. This is effected by means of a catch or pawl, *g*, fixed to the pinion, and a click or spring-pawl, *h*, fixed to the wheel *e*, the click slipping over the pawl when the wheel rotates in one direction, and slipping down in front of the teeth when the wheel rotates in the opposite direction.

*i* is a gear-sector engaging with the pinion *f*, and hung by means of an arm, K, to the main driving-shaft *l*, upon which it is fixed.

The shaft *l* also carries, at its outer end, a lever-arm, *m*, upon which the weight *n* is hung, for actuating the gearing.

The sector-arm K and the weighted arm *n*, together, form a lever, of which shaft *l* is the fulcrum, and, under the influence of the weight, operates to rotate the circuit-wheel through the medium of the sector, the pinion *f*, and the gear-wheel *e*.

Upward movement of the lever-arm *e* throws the sector down, (the pinion *f* turning loosely,) and when the lever-arm, after being raised, is released, the weight upon the arm automatically imparts such rotation through the sector-gear to the gear-shaft and circuit-wheel.

To retain the sector-teeth in engagement with the pinion, and to limit the number of rotations of the circuit-wheel, the extent of movement of the sector-arm is limited, the arm K striking against a pillar, *o*, when the weight is raised to set the train, and against another pillar, *p*, when the weight runs down, the weight, when released after being raised, always actuating the train and rotating the circuit-wheel until the sector-arm strikes the post *p*. As the weight is thus brought to a sudden stop, it is liable, through its momentum, to injure the teeth in the train unless some provision is made to lessen the shock. To accomplish this one or more springs are interposed between the weight and the pawl-wheel *h*.

In the drawings two such springs are shown, the weight *n* being directly hung to a spring, *q*, and the click *h* being formed upon the end of a spring, *r*, each spring yielding to the momentum of the weight when the sector-lever stops, such momentum being thus spent upon the springs instead of upon the gears of the train.

One or more springs may be differently disposed for this purpose, though the arrangement shown is simple and effective.

The circuit-wheel *d* is metal-surfaced, and the metal is broken by insulated spaces corresponding to the station of the signal-box.

The wheel shown in the drawings designates station 32, there being three insulated pieces or breaks in the metal perimeter of the wheel, denoting the number 3, separated by short spaces of metal from each other, and by a longer space of metal from two similar spaces or breaks, the rest of the surface of the wheel being occupied by a long space of metal.

On the surface of the wheel rests a series of spring-fingers, *s*, one or more for each wire *t* of the main circuit, one of which fingers rests upon the surface of the wheel, and one being in line with the insulated spaces or breaks, so that such breaks pass under the fingers as the wheel revolves. When the fingers are both in contact with the connected metal of the wheel the circuit is closed, and as the wheel rotates the circuit is broken as often as one of the breaks or insulated spaces comes under the outer finger, the number of short interruptions between the insulated spots denoting the first number of the station, the longer space between the first and second series of insulations making the interruption between the signals, to enable the numbers to be distinguished, and the contact of the outer finger with the insulated pieces of the second series determining the second number of the station from whence the signal is sent, the contact of the finger with the long blank space of the wheel-perimeter making the long interval between the successive signals given from the box.

To regulate the velocity of the circuit-wheel, or to render the movement uniform and regular, an escapement-shaft, *u*, is geared to the circuit-wheel shaft by a pinion, *v*, said shaft *u* bearing an escapement-wheel, *w*, with the teeth of which the teeth of a pallet, *x*, engage, said pallet being fixed upon a rocker-shaft, *y*, which has projecting from it the two blades of a reciprocating or vibrating fly, *z*.

The weighted lever is raised from the outside of the box by means of a lever, $a^2$, the mechanism through which this is effected being as follows: The lever *m* has projecting from it a pin, $b^2$, and when the weight has descended this pin comes directly over a lifter, $c^2$, on the end of the lever $a^2$. The lever $a^2$ is hung upon the inner surface of door of the signal-box by a screw-pin, and at the end opposite the lifter $c^2$ it has a projecting finger-piece, $e^2$, extending through a curved slot, $f^2$, in the door, as seen reduced at D, this slot being covered upon the inside of the door by a guard-plate, $g^2$, which excludes dust and rain. The lever $a^2$ is held in its normal position by a spring, $h^2$, in which position the lifter $c^2$ is at its lowest point. If the finger-piece $e^2$ is now depressed, the lifter $c^2$ will raise the lever, and thus set the weight so that it will act upon the train of gears and rotate the circuit-wheel, as before described, the lever $a^2$ being returned to normal position by the spring $h^2$, as seen, as the projection $e^2$ is released from the fingers.

To prevent the obstruction of the movement of the lever $m$ while the insulations or breaks of the circuit-wheel are under the fingers $s$, which obstruction would cause a false signal to be given by false interruptions, and which false interruptions might be caused by lifting the weight while the fingers $s$ and breaks were passing in contact, the pin $b^2$ is so arranged that it can only be operated by the lever $a^2$ when the weight has run down, or during the long pause after each complete signal. For this purpose, a plate, $i^2$, is fastened upon the inner or train box, $l^2$, this plate having a series of inclines, $m^2$, lying in the path of movement of the pin $b^2$. The pin $b^2$ plays loosely through the lever $a^2$, and is fastened to a spring, $n^2$, which presses it back toward the plate $i^2$. When the weight is down the inner end of the pin (which is made conical or with a conical head) rests against the apex of one of the inclines $m^2$, in which position the outer end of the pin projects out into the path of the lifter $c^2$. When the weight is raised the circuit-wheel is in position to commence to signal as soon as the weight is released and begins to fall, the lifter being returned to normal position by the spring $h^2$, the lifter swinging upon a pin, $o^2$, and being pressed out by a spring, $p^2$, which spring allows the lifter to fall back, as in descending it passes in contact with the pin $b^2$, as will be readily understood. In this position the pin is borne inward by its spring, and rests against the plate $i^2$, and cannot be touched by the lifter.

The breaks or insulations in the circuit-wheel having passed the fingers $s$, the pin is brought against the upper incline, $m^2$, and is pressed out thereby; and while the wheel is rotating, until the breaks again reach the fingers, the weight may be raised by the lifter, the pin sliding back out of the path of the lifter when the breaks again approach the springs, and so on until the weight has fully descended, thus allowing the weight to be fully reset at any time while the signal is not being transmitted, and preventing any interruption in the descent of the weight while the signal is being transmitted.

What is claimed is—

1. The combination, with the signaling mechanism of a fire-alarm-telegraph box, of an actuator for releasing or starting the mechanism in motion to make a signal, and mechanism to prevent the actuator from interrupting the signal or interfering with the signaling mechanism until the signal has been completed, for the purpose specified.

2. An automatic fire-alarm-telegraph box, consisting in the combination of gearing operated by a motor, a break-circuit or signaling mechanism electrically connected with the wires in the fire-alarm circuit, an actuator for releasing or starting the signaling mechanism in motion to make a signal, and mechanism to prevent the actuator from interfering with or interrupting the signals if operated while a signal is being made, for the purpose specified.

3. The combination, with the signaling mechanism of a fire-alarm-telegraph box and the actuator or starting device, of mechanism arranged in position to be operated by the pull for starting the signaling mechanism in motion, and when so operated disconnects the pull from the signaling mechanism until the signal has been completed, for the purpose specified.

4. The combination, with the signaling mechanism of a fire-alarm-telegraph box and the pull or starting device, of mechanism set within the path of the pull to be operated thereby for starting the signaling mechanism to make a signal, and by the same operation to be thrown or moved out of operative connection with the pull until the signal has been completed, for the purpose specified.

5. The combination of the circuit-wheel $d$, shaft $c$, pinion $f$, vibrating gear-sector $i$, driving-shaft $l$, mechanical motor $n$, and winding-lever $m$, said gear-sector meshing directly into the pinion $f$, substantially as and for the purpose specified.

6. The combination, with the signaling mechanism of a fire-alarm-telegraph box and the actuator for starting such mechanism in motion for making a signal, of mechanism interposed between the starting device and signaling mechanism, which, when operated by the pull for starting the signaling, moves out of operative connection with the pull until the signal has been completed, when it is automatically reset within the path of the pull to again receive its action, for the purpose specified.

7. In combination with the weighted lever and the gear-train operated by the lever, a spring or series of springs interposed between the weight and the rotating gears, substantially as described.

8. In combination with the gear-train and an escapement and pallet connected thereto, a reciprocating fly placed directly on the pallet-shaft, substantially as described.

9. In combination with the setting-lever $a^2$ and the slot through which the finger-piece of the lever traverses, the stationary guard-plate $g$, substantially as described.

10. In combination with the lever $a^2$, the swinging or spring lifter $c^2$, substantially as shown and described.

11. In combination with the weighted lever, the slide-pin $b^2$, so arranged that while it may be actuated by the lifter whenever the signal is not being transmitted, it cannot be operated while the signal is in course of transmission.

12. The combination, with the signaling mechanism of a fire-alarm-telegraph apparatus, of an actuator and a catch, against which the actuator bears to start the signaling mechanism in motion to make a signal, and which is automatically thrown out of the path of the actuator until the signal has been completed, for the purpose specified.

THE GAMEWELL FIRE
ALARM TELEGRAPH CO.,
By CHARLES BELL, *President.*

Witnesses:
B. S. CLARK,
E. A. ELLSWORTH.